US012125694B2

(12) United States Patent
Verenchikov et al.

(10) Patent No.: US 12,125,694 B2
(45) Date of Patent: *Oct. 22, 2024

(54) ION MIRROR FOR MULTI-REFLECTING MASS SPECTROMETERS

(71) Applicant: Micromass UK Limited, Wilmslow (GB)

(72) Inventors: Anatoly Verenchikov, Bar (ME); Mikhail Yavor, St. Petersburg (RU)

(73) Assignee: Micromass UK Limited, Wilmslow (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,547

(22) Filed: Jul. 26, 2023

(65) Prior Publication Data

US 2024/0030018 A1 Jan. 25, 2024

Related U.S. Application Data

(63) Continuation of application No. 17/586,421, filed on Jan. 27, 2022, now Pat. No. 11,756,782, which is a continuation of application No. 16/636,865, filed as application No. PCT/GB2018/052100 on Jul. 26, 2018, now Pat. No. 11,239,067.

(30) Foreign Application Priority Data

Aug. 6, 2017 (GB) ..................................... 1712612
Aug. 6, 2017 (GB) ..................................... 1712613
Aug. 6, 2017 (GB) ..................................... 1712614
Aug. 6, 2017 (GB) ..................................... 1712616
Aug. 6, 2017 (GB) ..................................... 1712617
Aug. 6, 2017 (GB) ..................................... 1712618
Aug. 6, 2017 (GB) ..................................... 1712619

(51) Int. Cl.
*H01J 49/40* (2006.01)

(52) U.S. Cl.
CPC .......... *H01J 49/406* (2013.01); *H01J 49/405* (2013.01)

(58) Field of Classification Search
CPC ...... H01J 49/401; H01J 49/403; H01J 49/405; H01J 49/406
See application file for complete search history.

(56) References Cited

U.S. PATENT DOCUMENTS 11,239,067 B2 * 2/2022 Verenchikov ......... H01J 49/406
11,295,944 B2 * 4/2022 Verenchikov ........ H05K 1/0225
2014/0312221 A1 * 10/2014 Verenchikov ......... H01J 49/405 250/282
2015/0028198 A1 * 1/2015 Grinfeld ............ H01J 49/0031 250/281

* cited by examiner

*Primary Examiner* — David E Smith
(74) *Attorney, Agent, or Firm* — Goodwin Procter LLP

(57) ABSTRACT

Improved ion mirrors 30 (FIG. 3) are proposed for multi-reflecting TOF MS and electrostatic traps. Minor and controlled variation by means of arranging a localized wedge field structure 35 at the ion retarding region was found to produce major tilt of ion packets time fronts 39. Combining wedge reflecting fields with compensated deflectors is proposed for electrically controlled compensation of local and global misalignments, for improved ion injection and for reversing ion motion in the drift direction. Fine ion optical properties of methods and embodiments are verified in ion optical simulations.

18 Claims, 5 Drawing Sheets

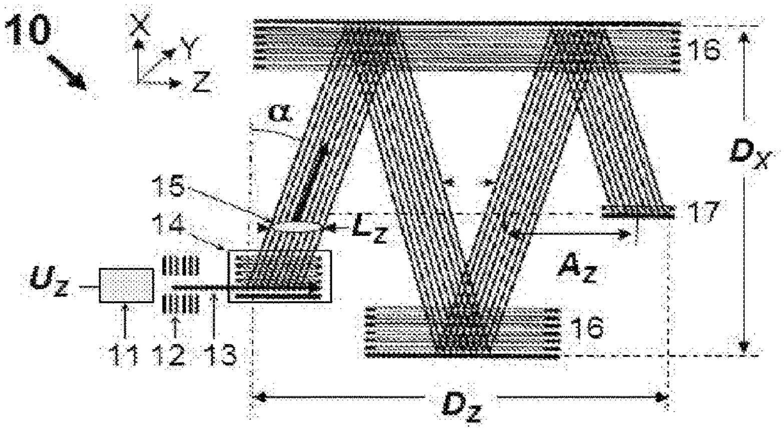
*Fig. 1: Prior Art*
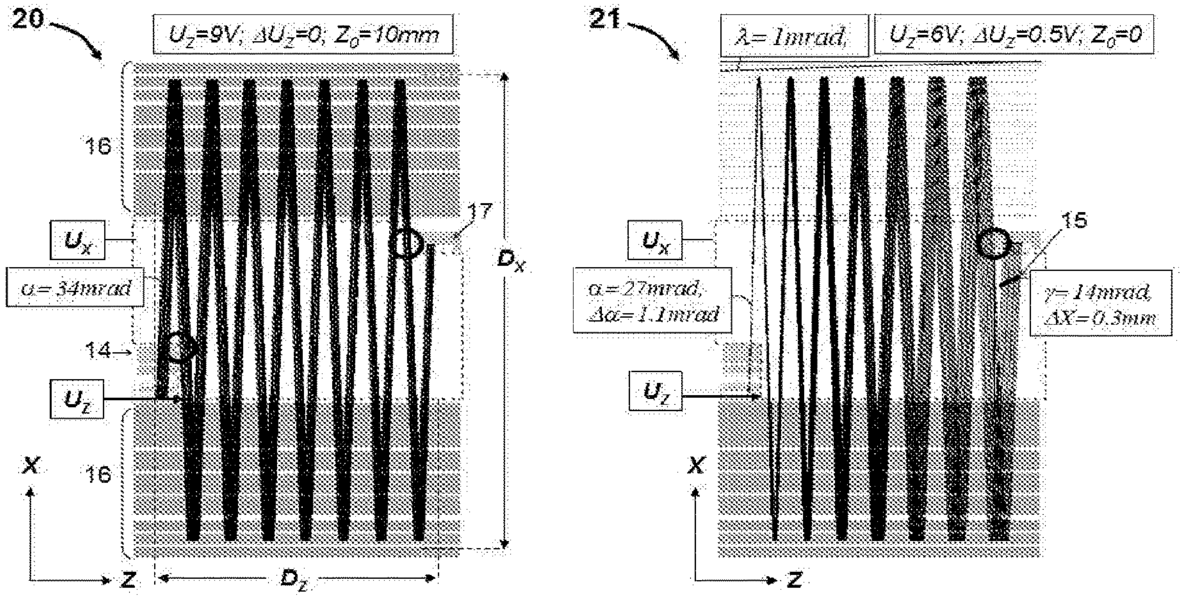
*Fig. 2*

ION MIRROR FOR MULTI-REFLECTING MASS SPECTROMETERS

CROSS-REFERENCE TO RELATED APPLICATION

This application is a continuation of U.S. patent application Ser. No. 17/586,421, filed on Jan. 27, 2022, which is a continuation of U.S. patent application Ser. No. 16/636,865, filed on Feb. 5, 2020, now U.S. Pat. No. 11,239,067, which is a U.S. national phase filing under 35 U.S.C. § 371 claiming the benefit of and priority to International Patent Application No. PCT/GB2018/052100, filed on Jul. 26, 2018, which claims priority from and the benefit of United Kingdom patent application No. 1712612.9, United Kingdom patent application No. 1712613.7, United Kingdom patent application No. 1712614.5, United Kingdom patent application No. 1712616.0, United Kingdom patent application No. 1712617.8, United Kingdom patent application No. 1712618.6 and United Kingdom patent application No. 1712619.4, each of which was filed on Aug. 6, 2017. The entire content of these applications is incorporated herein by reference.

FIELD OF INVENTION

The invention relates to the area of multi-reflecting time-of-flight mass spectrometers and electrostatic ion traps, and is particularly concerned with improved gridless ion mirrors.

BACKGROUND

Time-of-flight mass spectrometers (TOF MS) are widely used for combination of sensitivity and speed, and lately with the introduction of Multi-reflecting TOF MS (MR-TOF), for their high resolution and mass accuracy. Resolution improves primarily due to substantial extension of the ion path from L=1-5 m in singly reflecting TOF to L=10-100 m in MRTOF. To fit longer ion paths into reasonable size instruments, the ion path is densely folded, as described in SU1725289, U.S. Pat. Nos. 6,107,625, 6,570,152, GB2403063, U.S. Pat. No. 6,717,132, between gridless ion mirrors.

As exemplified by U.S. Pat. No. 6,744,042, WO2011086430, US2011180702, and WO2012116765, incorporated herein by reference, multi-reflecting analyzers are proposed for electrostatic ion traps, wherein ions are trapped within isochronous electrostatic analyzers, oscillate at mass dependent frequency, and the oscillation frequency is recorded with image current detectors for acquiring mass spectra.

Most of MRTOFs and a number of E-traps employ similar electrostatic analyzers composed of two parallel gridless ion mirrors, separated by a drift space. Mirrors are composed of frame electrodes, which are substantially extended in a so-called drift direction, conventionally denoted as Z-direction. If not using edge fringing fields, 2D gridless ion mirrors generate two dimensional (2D) electrostatic fields in the XY-plane between electrodes. Those fields are carefully engineered to provide for isochronous ion motion with high order compensation of time aberrations (up to full third order) and for spatial ion packet confinement in the XY-plane.

By nature, the electrostatic 2D-fields have zero component $E_Z=0$ in the orthogonal drift Z-direction, i.e. they have no effect on ion packets free propagation and its expansion in the drift Z-direction. In MRTOF, ion packets are injected at small inclination angle α for ion passage through the analyzer along zigzag ion trajectories with multiple N ion reflections between ion mirrors at relatively higher energies (usually 3-10 keV) combined with slow ion drift in the Z-direction. In E-traps, ions are injected nearly orthogonal to the Z-direction to stay trapped in multiple reflections between mirrors. Various trapping means may be used to avoid ion losses at Z-edges of ion mirrors, including isochronous edge retarding, cylindrical topology of ion mirrors, or gentle curvature of ion mirrors as in U.S. Pat. No. 9,136,101. Intuitively, experts felt that inaccuracy of making, electrode bend by internal material stress, or limited parallelism of electrodes mounting, or stray electric fields may affect the ion rays inclination angle. Multiple complex solutions were proposed to define the ion drift advance per reflection, withstanding the analyzer misalignments and to confine the angular divergence of ion packets: U.S. Pat. No. 7,385,187 proposed periodic lens and edge deflectors for MRTOF; WO2010008386 and then US2011168880 proposed quasi-planar ion mirrors having weak (but sufficient) spatial modulation of mirror fields; U.S. Pat. No. 7,982,184 proposed splitting mirror electrodes into multiple segments for arranging $E_Z$ field; U.S. Pat. No. 8,237,111 and GB2485825 proposed electrostatic traps with three-dimensional fields, though without sufficient isochronicity in all three dimensions and without non-distorted regions for ion injection; WO2011086430 proposed first order isochronous Z-edge reflections by tilting ion mirror edge combined with reflector fields; U.S. Pat. No. 9,136,101 proposed bent ion MRTOF ion mirrors with isochronicity recovered by trans-axial lens.

With limited experimental use of MRTOFs and electro-static-traps (E-traps), experts have not yet recognized the crucial and key role of minor ion mirror misalignments onto performance and tuning of both MRTOF and E-traps. However, up to inventors knowledge, so far experts had no hint of the power and the scale of ion mirror misalignment effects onto tilting of ion packets time-fronts, affecting isochronicity of E-analyzers. While such effects are relatively modest in the case of using narrow ion packets, they are capable of ruining the mass resolving power of analyzers in which ion packets are wide in the Z-direction, as for example happens when using packets from orthogonal accelerators with the continuous ion beam injected in the Z-direction. Those effects are aggregated by mixing of ion packets at multiple reflections, since time fronts are different for initially wide parallel ion packets and for initially diverging ion packets.

It is desired to improve design of gridless ion mirrors for MRTOF and E-Traps, so that to withstand electrode misalignments at reasonable machining accuracy and to provide mechanisms and methods for ion mirror tuning for improved control over ion drift motion and for improved isochronicity of electrostatic analyzers.

SUMMARY

From a first aspect the present invention provides an ion mirror comprising: a plurality of electrodes and at least one voltage supply connected thereto that are configured to generate an electric field region that reflects ions in a first dimension (X-dimension), and wherein at least part of the electric field region through which ions travel in use has equipotential field lines that diverge or converge as a function of position along a second, orthogonal dimension (Z-direction).

Said at least part of the electric field region having equipotential field lines that diverge or converge, enables the time front of an ion packet pulsed into the ion mirror to be tilted. This may be used, for example, to compensate for time front tilts caused by misaligned or bent ion mirror electrodes, or time front tilts generated in other ion optical components upstream or downstream of the ion mirror. It has been discovered that the electric field region of the embodiments may provide relatively strong time front tilting whilst providing only a minor change in the mean ion trajectory of the ion packet.

For the avoidance of doubt, the time front of the ions may be considered to be a leading edge/area of ions in the ion packet having the same mass to charge ratio (and which may have the same energy).

Said least part of the electric field region having equipotential field lines that diverge or converge may be configured to tilt the time front of ions being reflected in the ion mirror.

The ions may enter the ion mirror having a time front arranged in a first plane, and said at least part of the electric field region may cause the time front of the ions to be tilted at an angle to the first plane.

Said least part of the electric field region may be configured to tilt the time front of ions being reflected in the ion mirror by a first angle, in the X-Z plane, that is greater than a second angle by which the electric field region steers the average ion trajectory, in the X-Z plane.

Said at least part of the electric field region may be arranged at or proximate an end of the ion mirror, in the second dimension, and the equipotential field lines may converge as a function of distance, in the second dimension, away from said end.

The electrodes and voltage supplies may be configured to generate a wedge-shaped electric field region.

The wedge-shaped electric field region may be a linear wedge-shaped electric field region or may be a (slightly) curved wedge-shaped electric field region (e.g. is substantially wedge-shaped).

The ion mirror may be electrically adjustable so as to adjust the field in the electric field region.

Electrodes may be arranged and configured for generating said wedge-shaped electric field region therebetween such that equipotential field lines in the wedge-shaped electric field region are angled to each other so as to form the wedge-shape. Therefore, the equipotential field lines may converge towards one another in a direction towards a first end of the wedge-shaped electric field region (in the second dimension), and diverge away from one another in a direction towards a second opposite end of the wedge-shaped electric field region.

Ions travelling through said at least part of the electric field region may be reflected and then accelerated in the first dimension(X-dimension) by an amount that varies as a function of distance along the second dimension, since the equipotential field lines converge or diverge along the second dimension. This may cause the time front of the ions to be tilted.

The ion mirror may comprise one or more electrodes defining an opening through which the ions pass, wherein the opening has a width in a third dimension (Y-dimension) orthogonal to the first and second dimensions that varies as a function of position along the second dimension (Z-direction) for generating said equipotential field lines that diverge or converge.

The width may vary over at least part of the length (in the second dimension) of the ion mirror.

The width may increase as a function of distance away from one end (or both ends), in the second dimension, of the ion mirror.

The width of the opening may taper (e.g. progressively and gradually) as a function of position along the second dimension.

The opening may be a slotted aperture formed through an electrode. Alternatively, the opening may be defined between electrodes arranged on opposing sides of the ion mirror in the third dimension (Y-dimension) that is orthogonal to the first and second dimensions.

Said one or more electrodes may be arranged between (in the first dimension) an end cap electrode of the ion mirror and a frame electrode of the ion mirror, wherein the frame electrode comprises an opening through which the ions pass. The opening in the frame electrode may have a width in the third dimension that is substantially constant as a function of position along the second dimension and/or a length in the second dimension that is substantially constant as a function of position along the third dimension.

Said at least part of the electric field region having equipotential field lines that diverge or converge may be formed by at least one electrode being tilted relative to other mirror electrodes.

The mirror may therefore comprise one or more first electrode arranged in a first plane and one or more second electrode arranged in a second plane that is angled to the first plane so as to define the electric field region having equipotential field lines that diverge or converge between the one or more first electrode and one or more second electrode. The first and second planes may be angled with respect to each other in the plane defined by the first and second dimensions (X-Z plane).

Each of the first and second electrodes may be a frame electrode of the ion mirror, wherein the frame electrode comprises an opening through which the ions pass. Alternatively, the first electrode may be a frame electrode of the ion mirror and the second electrode may be the end cap electrode.

The ion mirror may comprise electrodes arranged on opposing sides of the ion mirror in a third dimension (Y-dimension) that is orthogonal to the first and second dimensions, wherein the ion mirror comprises one or more voltage supply configured to apply different voltages to different ones of these electrodes for generating said equipotential field lines that diverge or converge.

The ion mirror may comprise one or more first electrode arranged on a first side of the ion mirror, in the third dimension, and a plurality of second electrodes arranged on a second opposite side of the ion mirror; wherein the ion mirror is configured to apply different voltages to different ones of the second electrodes for generating said equipotential field lines that diverge or converge.

The different voltages may be DC voltages.

The second electrodes may be connected by a resistive chain such that a voltage supply connected to the resistive chain applies different electrical potentials to the second electrodes.

The ion mirror may be configured to apply different voltages to different ones of the first electrodes. The first electrodes may be connected by a resistive chain such that a voltage supply connected to the resistive chain applies different electrical potentials to the first electrodes.

Embodiments are also contemplated in which at least some of the electrodes connected by the resistive chain are replaced by a resistive layer.

Said one or more first electrode and/or said plurality of second electrodes may be arranged on a printed circuit board (PCB).

PCB as used herein may refer to a component containing conductive tracks, pads and other features etched from, printed on, or deposited on one or more sheet layers of material laminated onto and/or between sheet layers of a non-conductive substrate.

In embodiments in which electrodes are arranged on a PCB, a resistive layer may be provide between the electrodes, so as to avoid the insulating material of the substrate from becoming electrically charged.

The ion mirror may comprise a voltage supply and electrodes configured to apply a static electric field in an ion acceleration region adjacent, in a direction in which the ions are reflected, said part of the electric field region having equipotential field lines that diverge or converge; said ion acceleration region having parallel equipotential field lines for accelerating the ions out of the ion mirror.

The inventors have discovered that the ion acceleration region provides a strong amplifying effect onto the tilting angle of the ion packet time front (caused by said part of the electric field region having equipotential field lines that diverge or converge), whilst providing only a minor change in the mean ion trajectory.

The parallel equipotential field lines of the ion acceleration region may be parallel with the second dimension (Z-dimension) and may be formed by parallel electrodes that are parallel with the second dimension.

The ions may travel through the ion acceleration region substantially orthogonal to the parallel equipotential field lines.

The ion acceleration region may amplify the time front tilt of ions introduced by said part of the electric field region.

The ion mirror may have a first length in the second dimension that comprises said at least part of the electric field region having equipotential field lines that diverge or converge, and a second length in the second dimension that includes only parallel equipotential field lines for reflecting ions. Optionally, the ion mirror may have a third length in the second dimension that comprises said at least part of the electric field region having equipotential field lines that diverge or converge.

The first length may be arranged at a first end of the ion mirror. Optionally, the third length may be arranged at a second opposite end of the ion mirror (in the second dimension), with the second length between the first and third lengths.

The electrodes and voltage supplies of the ion mirror may be configured to allow the ions to drift in the second dimension (Z-direction) as they are being reflected in the first dimension (X-dimension).

The electrodes of said ion mirror may be substantially elongated in the second dimension and may form a substantially two-dimensional electrostatic field in plane orthogonal defined by the first dimension (X-dimension) and a third dimension (Y-dimension) orthogonal to the first and second dimensions.

The electrodes for generating said electric field region may be arranged to reflect ions substantially transverse to the equipotential field lines.

The equipotential field lines may diverge or converge as a function of position along the second dimension (Z-direction) in an ion retarding region of the ion mirror.

The ion retarding equipotential (e.g. the equipotential at which the ion mirror turns the ions) may be tilted or curved relative to the second dimension.

The ion mirror may be an electrostatic gridless ion mirror.

The ion mirror may be part of an electrostatic isochronous mass analyzer.

The present invention also provides a mass spectrometer comprising: a time-of-flight mass analyser or electrostatic ion trap having at least one ion mirror as described herein and a pulsed ion accelerator for pulsing ion packets into the ion mirror.

The pulsed ion accelerator may be one of: (i) a MALDI source; (ii) a SIMS source; (iii) a mapping or imaging ion source; (iv) an electron impact ion source; (v) a pulsed converter for converting a continuous or pseudo-continuous ion beam into ion pulses; (vi) an orthogonal accelerator; (vii) a pass-through orthogonal accelerator having an electrostatic ion guide; or (viii) a radio-frequency ion trap with pulsed ion ejection.

The pulsed ion accelerator may form ion packets that are elongated in the second direction.

The mass analyser may be an isochronous mass analyser.

The spectrometer may be an open trap mass spectrometer or an ion trap mass spectrometer with an image current detector.

The spectrometer may comprise: a multi-pass time-of-flight mass analyser or electrostatic ion trap having at least one ion mirror as described herein, and electrodes arranged and configured so as to provide an ion drift region that is elongated in a drift direction (z-dimension) and to reflect or turn ions multiple times in an oscillating dimension (x-dimension) that is orthogonal to the drift direction. Optionally, the drift direction (z-dimension) may correspond to said second dimension and/or the oscillating dimension (x-dimension) may corresponds t said first dimension.

The multi-pass time-of-flight mass analyser may be a multi-reflecting time of flight mass analyser having two ion mirrors that are elongated in the drift direction (z-dimension) and configured to reflect ions multiple times in the oscillation dimension (x-dimension), wherein at least one of said two ion mirrors is an ion mirror as described hereinabove. Alternatively, the multi-pass time-of-flight mass analyser may be a multi-turn time of flight mass analyser having an ion mirror as described herein above and at least one electric sector configured to reflect and turn ions multiple times in the oscillation dimension (x-dimension).

Where the mass analyser is a multi-reflecting time of flight mass analyser, the mirrors may be gridless mirrors.

Each mirror may be elongated in the drift direction and may be parallel to the drift dimension.

The spectrometer may comprise an ion deflector configured to back-steer the average ion trajectory of the ions, in the drift direction, thereby tilting the angle of the time front of the ions.

The ion deflector may be located downstream or upstream of said ion mirror.

The ion deflector may be located at substantially the same position in the drift direction as said at least part of the electric field region having equipotential field lines that diverge or converge.

The average ion trajectory of the ions travelling through the ion deflector may have a major velocity component in the oscillation dimension (x-dimension) and a minor velocity component in the drift direction. The ion deflector back-steers the average ion trajectory of the ions passing therethrough by reducing the velocity component of the ions in the drift direction. The ions may therefore continue to travel in the same drift direction upon entering and leaving the ion deflector, but with the ions leaving the ion deflector having a reduced velocity in the drift direction. This enables the ions to oscillate a relatively high number of times in the oscillation dimension, for a given length in the drift direction, thus providing a relatively high resolution. Additionally, or alternatively, the steering may be arranged such that the ions do not impact on ion optical elements other than the active surface of the detector, such as rims of the orthogonal accelerator, ion deflector or detector.

It is alternatively contemplated that the ion deflector may be configured to reverse the direction of the ions in the second dimension.

The electric field region having equipotential field lines that diverge or converge may be configured to tilt the time front of the ions passing therethrough so as to at least partially counteract a tilting of the time front by the ion deflector.

If the deflector is arranged downstream of the ion mirror, the ion mirror may tilt the time front of the ions in a first angular direction and the ion deflector may then tilt the angle of the time front in the opposite angular direction, at least partially back towards the plane it was in when the ions entered the ion mirror.

If the deflector is arranged upstream of the ion mirror, the deflector may tilt the time front of the ions in a first angular direction and the ion mirror may then tilt the angle of the time front in the opposite angular direction, at least partially back towards the plane it was in when the ions entered the ion deflector.

The time-front tilt angle introduced by the ion mirror and the ion steering angle introduced by the ion deflector may be electrically adjusted, or set, to compensate the T|Z and/or T/ZZ time-of-flight aberrations at the detector.

The ion deflector may be an electrostatic deflector.

The ion deflector may be configured to generate a quadrupolar field for controlling the spatial focusing of the ions in the drift direction.

It has been recognised that a conventional ion deflector inherently has a relatively high focusing effect on the ions, hence undesirably increasing the angular spread of the ion trajectories exiting the deflector, as compared to the angular spread of the ion trajectories entering the ion deflector. This may cause excessive spatial defocusing of the ions downstream of the focal point, resulting in ion losses and/or causing ions to undergo different numbers of oscillations in the spectrometer before they reach the detector. This may cause spectral overlap due to ions from different ion packets being detected at the same time. The mass resolution of the spectrometer may also be adversely affected. Such conventional ion deflectors are therefore particularly problematic in multi-pass time-of-flight mass analysers or multi-pass electrostatic ion traps, since a large angular spread of the ions will cause any given ion packet to diverge a relatively large amount over the relatively long flight path through the device. Embodiments of the present invention provide an ion deflector configured to generate a quadrupolar field that controls the spatial focusing of the ions in the drift direction, e.g. so as to maintain substantially the same angular spread of the ions passing therethrough, or to allow only the desired amount of spatial focusing of the ions in the z-direction.

The quadrupolar field for in the drift direction may generate the opposite ion focusing or defocusing effect in the dimension orthogonal to the drift direction and oscillation dimension. However, it has been recognised that the focal properties of MPTOF mass analyser (e.g. MRTOF mirrors) or electrostatic trap are sufficient to compensate for this.

The ion deflector may be configured to generate a substantially quadratic potential profile in the drift direction.

The ion deflector may back steer all ions passing therethrough by the same angle; and/or the ion deflector may control the spatial focusing of the ion packet in the drift direction such that the ion packet has substantially the same size in the drift dimension when it reaches an ion detector in the spectrometer as it did when it enters the ion deflector.

The ion deflector may control the spatial focusing of the ion packet in the drift direction such that the ion packet has a smaller size in the drift dimension when it reaches a detector in the spectrometer than it did when it entered the ion deflector.

At least one voltage supply may be provided that is configured to apply one or more first voltage to one or more electrode of the ion deflector for performing said back-steer and one or more second voltage to one or more electrode of the ion deflector for generating said quadrupolar field for said spatial focusing, wherein the one or more first voltage is decoupled from the one or more second voltage.

The ion deflector may comprise at least one plate electrode arranged substantially in the plane defined by the oscillation dimension and the dimension orthogonal to both the oscillation dimension and the drift direction (X-Y plane), wherein the plate electrode is configured back-steer the ions; and the ion deflector may comprise side plate electrodes arranged substantially orthogonal to the at least one plate electrode and that are maintained at a different potential to the plate electrode for controlling the spatial focusing of the ions in the drift direction.

The side plates may be Matsuda plates.

The at least one plate electrode may comprise two electrodes and a voltage supply for applying a potential difference between the electrodes so as to back-steer the average ion trajectory of the ions, in the drift direction.

The two electrodes may be a pair of opposing electrodes that are spaced apart in the drift direction.

However, it is contemplated that only the upstream electrode (in the drift direction) may be provided, so as to avoid ions hitting the downstream electrode.

The ion deflector may be configured to provide said quadrupolar field by comprising one or more of: (i) a trans-axial lens/wedge; (iii) a deflector with aspect ratio between deflecting plates and side walls of less than 2; (iv) a gate shaped deflector; or (v) a toroidal deflector such as a toroidal sector.

The ion deflector may be arranged such that it receives ions that have already been reflected or turned in the oscillation dimension by the multi-pass time-of-flight mass analyser or electrostatic ion trap; optionally after the ions have been reflected or turned only a single time in the oscillation dimension by the multi-pass time-of-flight mass analyzer or electrostatic ion trap.

The location of the deflector directly after the first ion mirror reflection allows yet denser ray folding The ion mirror having said equipotential field lines that diverge or converge and ion deflector may tilt the time front of the ions so that it is aligned with the ion receiving surface of the ion detector and/or to be parallel to the drift direction (z-dimension).

The mass analyser or electrostatic trap may be an isochronous and/or gridless mass analyser or an electrostatic trap.

The mass analyser or electrostatic trap may be configured to form an electrostatic field in a plane defined by the oscillation dimension and the dimension orthogonal to both the oscillation dimension and drift direction (i.e. the XY-plane).

This two-dimensional field may have a zero or negligible electric field component in the drift direction (in the ion passage region). This two-dimensional field may provide isochronous repetitive multi-pass ion motion along a mean ion trajectory within the XY plane.

The energy of the ions received at the pulsed ion accelerator and the average back steering angle of the ion deflector may be configured so as to direct ions to an ion detector after a pre-selected number of ion passes (i.e. reflections or turns).

The spectrometer may comprise an ion source. The ion source may generate an substantially continuous ion beam or ion packets.

The spectrometer may comprise a pulsed ion accelerator such as a gridless orthogonal accelerator.

The pulsed ion accelerator has a region for receiving ions (a storage gap) and may be configured to pulse ions orthogonally to the direction along which it receives ions. The pulsed ion accelerator may receive a substantially continuous ion beam or packets of ions, and may pulse out ion packets.

The drift direction may be linear (i.e. a dimension) or it may be curved, e.g. to form a cylindrical or elliptical drift region.

The mass analyser or ion trap may have a dimension in the drift direction of: ≤1 m; ≤0.9 m; ≤0.8 m; ≤0.7 m; ≤0.6 m; or ≤0.5 m. The mass analyser or trap may have the same or smaller size in the oscillation dimension and/or the dimension orthogonal to the drift direction and oscillation dimension.

The mass analyser or ion trap may provide an ion flight path length of: between 5 and 15 m; between 6 and 14 m; between 7 and 13 m; or between 8 and 12 m.

The mass analyser or ion trap may provide an ion flight path length of: ≤20 m; ≤15 m; ≤14 m; ≤13 m; ≤12 m; or ≤11 m. Additionally, or alternatively, the mass analyser or ion trap may provide an ion flight path length of: ≥5 m; ≥6 m; ≥7 m; ≥8 m; ≥9 m; or ≥10 m. Any ranges from the above two lists may be combined where not mutually exclusive.

The mass analyser or ion trap may be configured to reflect or turn the ions N times in the oscillation dimension, wherein N is: ≥5; ≥6; ≥7; ≥8; ≥9; ≥10; ≥11; ≥12; ≥13; ≥14; ≥15; ≥16; ≥17; ≥18; ≥19; or ≥20. The mass analyser or ion trap may be configured to reflect or turn the ions N times in the oscillation dimension, wherein N is: ≤20; ≤19; ≤18; ≤17; ≤16; ≤15; ≤14; ≤13; ≤12; or ≤11. Any ranges from the above two lists may be combined where not mutually exclusive.

The spectrometer may have a resolution of: ≥30,000; ≥40,000; ≥50,000; ≥60,000; ≥70,000; or ≥80,000.

The spectrometer may be configured such that the pulsed ion accelerator receives ions having a kinetic energy of: ≥20 eV; ≥30 eV; ≥40 eV; ≥50 eV; ≥60 eV; between 20 and 60 eV; or between 30 and 50 eV. Such ion energies may reduce angular spread of the ions and cause the ions to bypass the rims of the orthogonal accelerator.

The spectrometer may comprise an ion detector.

The detector may be an image current detector configured such that ions passing near to it induce an electrical current in it. For example, the spectrometer may be configured to oscillate ions in the oscillation dimension proximate to the detector, inducing a current in the detector, and the spectrometer may be configured to determine the mass to charge ratios of these ions from the frequencies of their oscillations (e.g. using Fourier transform technology). Such techniques may be used in the electrostatic ion trap embodiments.

The detector for an electrostatic trap may alternatively be a sampling detector, e.g. as described in WO2011086430, FIG. 11. Ion packets may pass multiple times through a substantially (e.g. 99%) transparent mesh. A small proportion of the ions (e.g. 1%) hit the mesh and generate secondary electrons, which may be sampled. For example, the electrons may be detected by a detector (such as a TOF detector), e.g. a MCP or SEM. This may generate a series of periodic sharp signals, which may be interpreted similar to the Fourier transform MS method. The sharp signal improves resolution over standard image current signals. The detection of individual ions also improves sensitivity over an image current detector.

Alternatively, the ion detector may be an impact ion detector that detects ions impacting on a detector surface. The detector surface may be parallel to the drift dimension.

The ion detector may be arranged between the ion mirrors (or ion mirror and sectors), e.g. midway between (in the oscillation dimension) opposing ion mirrors.

From a second aspect, the present invention provides an ion mirror comprising: a plurality of electrodes and at least one voltage supply connected thereto that are configured to generate an electric field region that reflects ions in a first dimension (X-dimension), and wherein at least part of the electric field region through which ions travel in use has equipotential field lines that diverge, converge or curve as a function of position along a second, orthogonal dimension (Z-direction); wherein the ion mirror comprises tuning electrodes arranged on opposing sides of the ion mirror in a third dimension (Y-dimension) that is orthogonal to the first and second dimensions, and voltage supplies configured to apply different voltages to different ones of the tuning electrodes for generating said equipotential field lines that diverge, converge or curve; and wherein the voltage supplies are configured to be adjustable so as to adjust the voltages applied to the tuning electrodes.

The voltage supplies may be adjustable so as to adjust the voltages applied to the tuning electrodes to compensate for one or more time front tilt introduced to ions passing through the ion mirror, in use, due to the (mis)alignment or bending of electrodes in the ion mirror.

The ion mirror of the second aspect of the invention may have any of the features described in relation to the first aspect of the invention.

For example, the ion mirror may comprise one or more first electrode arranged on a first side of the ion mirror, in the third dimension, and a plurality of second electrodes arranged on a second opposite side of the ion mirror; wherein the ion mirror is configured to apply different voltages to different ones of the second electrodes and/or first electrodes for generating said equipotential field lines that diverge, converge or curve.

The different voltages may be DC voltages.

The second electrodes may be connected by a resistive chain such that a voltage supply connected to the resistive chain applies different electrical potentials to the second electrodes.

The first electrodes may be connected by a resistive chain such that a voltage supply connected to the resistive chain applies different electrical potentials to the first electrodes.

Embodiments are also contemplated in which at least some of the electrodes connected by the resistive chain are replaced by a resistive layer.

Said one or more first electrode and/or said plurality of second electrodes may be arranged on a printed circuit board (PCB).

In embodiments in which electrodes are arranged on a PCB, a resistive layer may be provide between the electrodes, so as to avoid the insulating material of the substrate from becoming electrically charged The ion mirror may have a first length in the second dimension that comprises said at least part of the electric field region having equipotential field lines that diverge, converge or curve, and a second length in the second dimension that includes only parallel equipotential field lines for reflecting ions. The first length may be arranged at a first end of the ion mirror.

Optionally, the ion mirror has a third length in the second dimension that comprises said at least part of the electric field region having equipotential field lines that diverge, converge or curve.

The third length may be arranged at a second end of the ion mirror (in the second dimension), with the second length between the first and third lengths.

The ion mirror may comprise electrodes that are tilted at an angle with respect to each other in a plane defined by the first and second dimensions (X-Z plane); and/or may comprise one or more electrodes that are bent in a plane defined by the first and second dimensions (X-Z plane).

For example, the ion mirror may have a cap electrode that is tilted relative to a frame electrode, or frame electrodes that are tilted relative to each other.

The present invention also provides a method of mass spectrometry comprising: providing an ion mirror or mass spectrometer as described hereinabove; applying voltages to electrodes of the ion mirror so as to generate said electric field region having equipotential field lines that diverge, converge or curve as a function of position along the second dimension (Z-direction); and reflecting ions in the ion mirror in the first dimension (X-dimension).

The method may comprise tilting the time front of the ions in the ion mirror.

The method may comprise varying the divergence, convergence or curvature of the equipotential field lines (as a function of position along the second dimension) with time.

The ion mirror may comprise a voltage supply and electrodes that apply a static electric field in an ion acceleration region adjacent (in a direction in which the ions are reflected) said part of the electric field region having equipotential field lines that diverge, converge or curve; said ion acceleration region having parallel equipotential field lines for accelerating the ions out of the ion mirror.

The method may comprise varying the strength of the static electric field as a function of time.

The steps of varying the equipotential field lines and/or a static electric field may be performed so as to change the tilt of the time front of the ions.

The second aspect of the present invention also provides a method of tuning an ion mirror comprising: providing an ion mirror as described above; and adjusting the voltage supplies as a function of time so as to vary the voltages applied to the tuning electrodes and the divergence, convergence or curvature of said equipotential field lines.

The voltage supplies may be adjusted until the voltages applied to the tuning electrodes compensate for one or more time front tilt introduced to ions passing through the ion mirror, in use, due to the (mis)alignment or bending of electrodes in the ion mirror.

A commonly used model of the whole mirror tilted at angle $\Phi$ predicts that both time front tilt angle $\gamma$ and ray steering angle $\phi$ induced by ion packet reflection from such mirror are twice the mirror tilt angle $\theta$. $\gamma=2\Phi$; $\phi=2\Phi$. Contrary to the widely admitted and used model, the inventors have discovered a strong amplifying effect on the tilting angle $\gamma$ of the ion packet time front by wedge (tilted) electrostatic fields localized in the ion reflecting region, accompanied by very minor angle $\phi$ of ion ray steering. The proposed model described herein for ion mirrors with misaligned electrodes in the ion reflecting region assumes a wedge field with tilted equipotential lines being bound by reflecting equipotential at zero mean ion energy K=0 and an equipotential line parallel to the Z-direction at energy $K=K_1$, followed by post-acceleration to energy $K=K_0$ by a flat (2D) field with equipotential lines being parallel to the drift Z-direction. The proposed model predicts twice larger time front tilt angle $\gamma=4\Phi$ at hypothetical case of $K_1=K_0$ and much larger time front tilt angle $\gamma=4\Phi*(K_0/K_1)^{0.5}$ in case of realistic ion mirrors with wedge fields localized in the vicinity of the ion turning point. Contrary to the conventional model, where $\gamma=\phi$, the new model predicts a large difference between time front tilt angle and the ray steering angle: $\gamma=3\phi*K_0/K_1$, where the realistic energy factor $K_0/K_1$ is expected between 10 and 30. In other words, contrary to knowledge of prior art, minor equipotential line tilt in ion reflecting regions actually produce much stronger tilt of time fronts and much smaller ion ray steering.

It is further realized that because of presence of the ion angular divergence, ion packets mix within E-analyzers at multiple reflections, that is time front tilts are different for initially parallel ion trajectories and initially divergent ones, so that it is much more preferable to compensate the parasitic, i.e. unintentional, time-front tilts locally along the whole Z-extension of the mirror. Embodiments of the invention propose introducing electronically controlled auxiliary wedge and/or electronically controlled bow fields for local compensation.

It is further realized that a combination of deflectors with ion mirrors with local wedge fields allow isochronous ion ray steering, where time front tilting of both devices are mutually compensated. Such steering is immediately useful for multiple ion injection schemes, for reverting of ion drift motion in the drift Z-direction (this way further increasing ion path), and for ion entrapment in E-traps in the Z-direction. The ray steering mechanism is further improved by introducing so-called compensated deflectors, incorporating quadrupolar field, in most simple example produced by Matsuda plates, or alternatively by trans-axial wedge and/or lens. The compensated deflectors overcome the over-focusing of conventional deflectors in MPTOF, so as provides an opportunity for controlled ion packet focusing and defocusing.

The ion optical quality of the proposed compensated steering is improved: it simultaneously removes so-called chromatic angular spread $\alpha|\delta$, and accompanying focusing/defocusing in the transverse Y-direction appears well compensated by isochronous and spatial focusing properties of 2D ion mirror fields.

An important feature of embodiments of the invention is the electronic control and tuning by adjusting parameters of wedge ion mirror, deflection angles, focusing by quadrupolar fields and by ion injection energies, as described below in multiple embodiments.

According to embodiments of the invention there is provided, within electrostatic isochronous mass analyzer, an electrostatic gridless ion mirror comprising means for generating at least one electrically adjustable wedge or curved wedge field in the ion retarding region with equipotential lines diverging or converging in the first Z-direction, said direction being perpendicular to the second X-direction of ion reflection from the mirror at the XZ-plane of ion motion in the mirror.

Preferably, said mirror may further comprise a set of parallel electrodes to form a "flat" post-acceleration field with equipotential lines parallel to the first Z-direction.

Preferably, electrodes of said gridless ion mirror may be substantially elongated in the first Z-direction and form substantially two dimensional electrostatic field in the orthogonal XY-plane.

Preferably, said means for generating said wedge or curved wedge field comprise one of the group: (i) a wedge slit electrode oriented substantially orthogonal to electric field lines of said wedge field; (ii) at least one electrode being tilted relative to other mirror electrodes; and (iii) a printed circuit board with multiple conductive pads interconnected by a resistive chain, said conductive pads are aligned with the direction of field lines divergence in said wedge field.

Preferably, said isochronous mass analyzer may be one of the group: (i) time-of-flight mass spectrometer; (ii) an open trap mass spectrometer; and (iii) an ion trap mass spectrometer with an image current detector.

Preferably, electrodes of said ion mirror are made of printed circuit boards (PCB) with partially conductive surface, and wherein said wedge or arc ion retarding field is electrically adjusted to compensate for tilt and bow of said electrodes at standard accuracy of the PCB technology.

According to embodiments of the invention there is provided, within a method of mass spectral analysis in electrostatic fields of an isochronous mass analyzer, an electrostatic field of gridless ion mirror comprising at least one electrically adjustable wedge or curved wedge field in the ion retarding region with equipotential lines, diverging or converging in the first Z-direction, said direction being perpendicular to the second X-direction of ion reflection from the mirror at the XZ-plane of ion motion in the mirror, said wedge or curved wedge field followed by a region of a flat post-acceleration field with equipotential lines parallel to said first Z-direction.

Preferably, said field may be substantially elongated in the first Z-direction and two dimensional in the orthogonal XY-plane.

Preferably, said method of mass spectral analysis may comprise one of the group: (i) time-of-flight mass analysis; (ii) mass analysis within an open ion trap; and (iii) mass analysis within an ion trap mass spectrometer with an image current detector.

Preferably, said wedge field may be electrically adjusted to tilt time front of ion packets, used for one purpose of the group: (i) compensating the time front tilt at ion ray steering by deflectors or lenses; (ii) compensating the time front tilt at ion ray steering by trans-axial deflectors or lenses; (iii) for compensating unintentional misalignments of ion mirror electrodes; and (iv) for compensating misalignments of mass spectrometer components, such as ion sources, accelerators and deflectors.

According to embodiments of the invention, there is provided a multi-reflecting mass spectrometer comprising:

(a) a pulsed ion source or a pulsed converter generating ion packets substantially elongated in the first Z-direction;
(b) a pair of parallel gridless ion mirrors separated by a drift space; electrodes of said ion mirrors are substantially elongated in the Z-direction to form an essentially two-dimensional electrostatic field in an orthogonal XY-plane; said field provides for an isochronous repetitive multi-pass ion motion and spatial ion confinement along a zigzag mean ion trajectory lying within the XY symmetry plane;
(c) an ion detector;
(d) at least one electrically adjustable electrostatic deflector, arranged for steering of ion trajectories for angle ψ, associated with equal tilting of ion packets time front;
(e) at least one electrode structure to form at least one electrically adjustable wedge electrostatic field with equipotential lines diverging or converging in said Z-direction in the retarding region of said ion mirror, followed by electrostatic acceleration in a flat field with equipotential lines parallel to said Z-direction; said at least one wedge field is arranged for the purpose of adjusting the time-front tilt angle γ of said ion packets, associated with steering of ion trajectories at much smaller (relative to said angle γ) inclination angle φ;
(f) wherein said steering angles ψ and φ are arranged for either denser folding of ion trajectories, and/or for bypassing rims of said source or of said deflector or of said detector by ion packets, and/or for reverting ion drift motion; and
(g) wherein said time-front tilt angle γ and said ion steering angles ψ are electrically adjusted for compensating the T|Z and/or T/ZZ time-of-flight aberrations at said detector.

Preferably, for the purpose of controlling spatial defocusing or focusing of said at least one deflector, an additional quadrupolar field may be formed within said deflector by at least one electrode structure of the group: (i) Matsuda plates; (ii) gate shaped deflecting electrode; (iii) side shields of the deflector with the aspect ratio under 2; (iv) toroidal sector deflection electrodes; and (v) additional electrode curvature within a trans-axial wedge deflector.

Preferably, said reflecting wedge field within ion retarding region of at least one ion mirror may be arranged with one electrode structure of the group: (i) a wedge slit oriented in the ZY-plane and located between mirror electrodes; (ii) at least one printed circuit board with discrete electrodes aligned in the Z-direction, connected via resistive divider and located between mirror electrodes; (iii) a locally tilted portion of at least one electrode of said ion mirror; and (iv) at least one split portion of at least one electrode of said ion mirror, connected to a separate potential.

Preferably, for the purpose of electrically compensating unintentional minor inaccuracy of misalignments of said ion mirrors, said ion mirror may further comprise at least one printed circuit board, located between said mirror electrodes; said board forms discrete electrodes, connected via resistive chain to form a wedge or an arc shaped electrostatic wedge field within the ion retarding region of at least one ion mirror.

Preferably, said pulsed ion source or said pulsed converter may comprise one of the group: (i) a MALDI source; (ii) a SIMS source; (iii) a mapping or imaging ion source; (iv) an electron impact ion source; (v) an orthogonal accelerator; (vi) a pass-through orthogonal accelerator with an electrostatic ion guide; and (vii) a radio-frequency ion trap with radial pulsed ion ejection.

BRIEF DESCRIPTION OF THE DRAWINGS

Various embodiments will now be described, by way of example only, and with reference to the accompanying drawings in which:

FIG. 1 shows prior art U.S. Pat. No. 6,717,132 planar multi-reflecting TOF with gridless orthogonal pulsed accelerator OA, and;

FIG. 2 illustrates problems of dense trajectory folding and limitations set by mechanical precision of the analyzer of FIG. 1;

DETAILED DESCRIPTION

Figure 3:
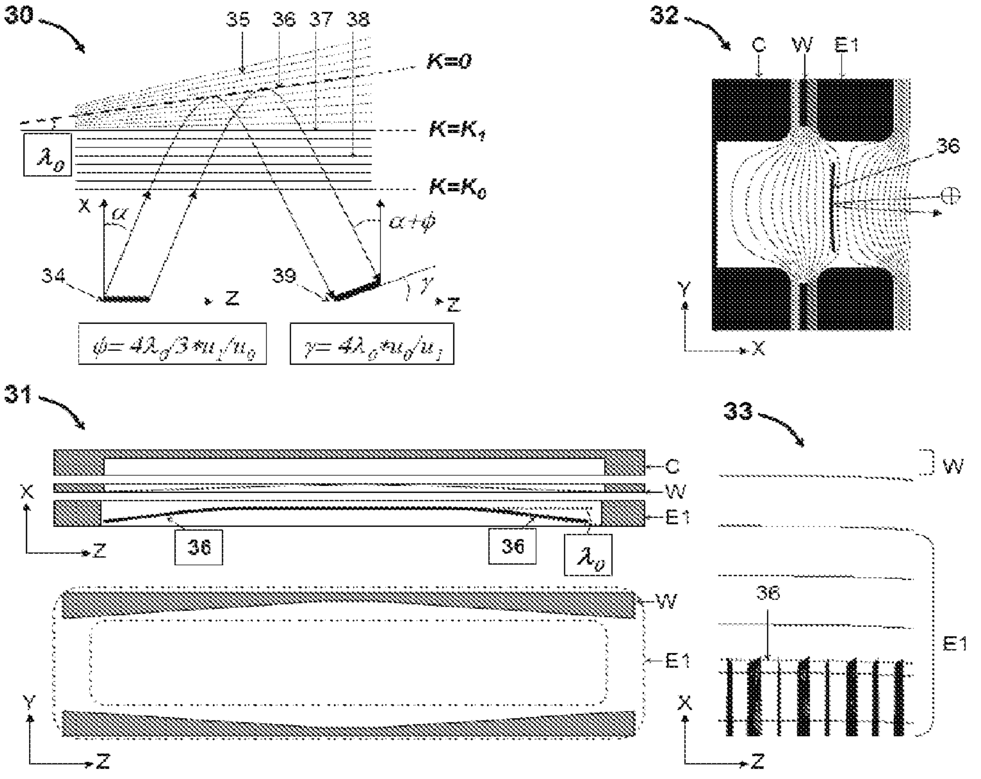
FIG. 3 shows novel amplifying reflecting wedge field of an embodiment of the present invention used for electrically adjustable tilt of ion packets time-front; shows one mirror wedge achieved with a wedge slit; and presents simulated field structure with bent retarding equipotential.

Referring to FIG. 1, a prior art multi-reflecting TOF instrument 10 according to U.S. Pat. No. 6,717,132 is shown having an orthogonal accelerator (OA-MRTOF). MRTOF 10 comprises: an ion source 11 with a lens system 12 to form a substantially parallel ion beam 13; an orthogonal accelerator (OA) 14 with a storage gap to admit the beam 13; a pair of gridless ion mirrors 16, separated by a field-free drift region, and a detector 17. Both OA 14 and mirrors 16 are formed with plate electrodes having slit openings, oriented in the Z-direction, thus forming a two dimensional electrostatic field, symmetric about the XZ symmetry plane (also denoted as s-plane). Accelerator 14, ion mirrors 16 and detector 17 are parallel to the Z-axis. In operation, ion source 11 generates a continuous ion beam. Commonly, ion sources 11 comprise gas-filled radio-frequency (RF) ion guides (not shown) for gaseous dampening of ion beams. Lens 12 forms a substantially parallel continuous ion beam 13, entering OA 14 along the Z-direction. An electrical pulse in OA 14 ejects ion packets 15, which travel in MRTOF at small inclination angle $\alpha$ (to the X-dimension), controlled by the ion source bias $U_Z$.

Referring to FIG. 2, simulation examples 20 and 21 illustrate multiple problems of prior art MRTOF 10, if pushing for higher resolutions and denser trajectory folding. Exemplary MRTOF parameters are: $D_X$=500 mm cap-cap distance; $D_Z$=250 mm wide portion of non-distorted XY-field; acceleration potential is $U_X$=8 kV, OA rim=10 mm and detector rim=5 mm.

In the example 20, to fit 14 reflections (i.e. L=7 m flight path) the source bias is set to $U_Z$=9V. Parallel rays with an initial width in the z-direction of $Z_0$=10 mm and no angular spread $\Delta\alpha$=0 start hitting rims of OA 14 and of detector 17. In example 21, the top ion mirror is tilted by $\lambda$=1 mrad, representing the realistic overall effective angle of mirror tilt, accounting for built up faults of stack assemblies, standard accuracy of machining and moderate electrode bend by internal stress at machining. Every "hard" ion reflection in the top ion mirror then changes the inclination angle $\alpha$ by 2 mrad. The inclination angle $\alpha$ grows from $\alpha_1$=27 mrad to $\alpha_2$=41 mrad, gradually expanding the central trajectory. To hit the detector after N=14 reflections, the source bias has to be reduced to $U_Z$=6V. The angular divergence is amplified by the mirror tilt and increase the ion packets width in the z-direction to $\Delta Z$=18 mm, inducing ion losses on the rims. Obviously, slits in the drift space may be used to avoid trajectory overlaps and spectral confusion, however, at a cost of additional ionic losses.

In example 21, the inclination of ion mirror introduces yet another and much more serious problem—the time-front 15 of the ions becomes tilted by angle $\gamma$=14 mrad in-front of the detector. The total ion packet spreading in the time-of-flight X-direction $\Delta X=\Delta Z^*\gamma$=0.3 mm limits mass resolution to $R<L/2\Delta X$=11,000 at L=7 m flight path, being low even for a regular TOF and too low for MRTOF. To avoid the limitation, the electrode precision has to be brought to non-realistic levels: $\lambda$<0.1 mrad, translated to better than 10 um accuracy and straightness of individual electrodes.

Summarizing the problems of prior art MRTOF, attempts of increasing flight path require much lower specific energies $U_Z$ of continuous ion beam and larger angular divergences $\Delta\alpha$ of ion packets, which induce ion losses on component rims and may produce spectral overlaps. Most important, small mechanical imperfections strongly affect MRTOF resolution and require unreasonably high precision.

Embodiments of the present invention propose to arrange wedge-shaped electrostatic fields with equipotential lines diverging in the Z-direction in the reflecting region of electrostatic gridless ion mirrors of either MRTOF or E-traps for effective and electrically adjustable control over the ion packets time-front tilt angle $\gamma$.

Referring to FIG. 3, a model gridless ion mirror 30 according to an embodiment of the present invention is shown and comprises a wedge reflecting field 35 and a flat post-accelerating field 38. An ion packet 34 (formed with any pulsed converter or ion source) is initially aligned with the Z-axis, as shown by a line for the time front. The ion packet 34 initially has a mean (average) ion energy $K_0$ and energy spread $\Delta K$. The ion packet 34 passes through field 38 and enters the wedge-shaped field 35 in the ion mirror at an inclination angle $\alpha$ (to the X-dimension). The ions are then reflected by the ion mirror (in the X-direction) and pass through the accelerating field 38.

Flat field 38 has equipotential lines arranged parallel to the Z-axis within potential boundaries corresponding to mean energies $K_0$ and $K_1$ of the ions, where $K_0>K_1$. Model wedge field 35 may be arranged with uniformly diverging equipotential lines in the XZ-plane, where the field strength E(z) is independent on the X-coordinate, and within the ion passage Z-region the field E(z) is reverse proportional to the Z-coordinate: E(z)~1/z. Wedge field 35 starts at equipotential corresponding to $K=K_1$ and continues at least to the ion retarding equipotential 36 (K=0), tilted to Z-axis at $\lambda_0$ angle. This arrangement causes the time-front of the ion packet to be tilted by angle $\gamma$ relative to the Z-axis, and the average trajectory of the ion packet (relative to the X-dimension) to be altered by steering angle $\phi$.

While applying standard mathematics a non-expected and previously unknown result was arrived at: in ion mirror 30 with wedge field 35, the time-front tilt angle $\gamma$ and the ion steering angle $\phi$ are controlled by the energy factor $K_0/K_1$ as:

$$\gamma=4\lambda_0*(K_0/K_1)^{0.5}=4\lambda_0*u_0/u_1$$

$$\phi=4\lambda_0/3*(K_1/K_0)^{0.5}=4\lambda_0/3*u_1/u_0$$

$$\text{i.e. } \gamma/\phi=3K_0/K_1>>1$$

where $K_1$ and $K_0$ are the mean ion kinetic energies at the exit of the wedge field 35 (index 1) and at the exit of flat field 38 (index 0) respectively, and $u_1$ and $u_0$ are the corresponding mean ion velocities. The angle ratio $\gamma/\phi=3K_0/K_1$ may be practically reaching well over 10 or 30 and is controlled electronically.

At $K_0/K_1$=1 (i.e. without acceleration in the field 38), the wedge field already provides twice larger time front tilt $\gamma$ compared to fully tilted ion mirrors ($\gamma=4\lambda_0$ Vs $\gamma=2\lambda_0$), while producing a smaller steering angle ($\phi=4/3\lambda_0$ Vs $\phi=2\lambda_0$). The angle ratio $\gamma/\phi$ further grows with the energy factor as $K_0/K_1$ because the angles are transformed with ion acceleration in the field 38: both flight time difference dT and z-velocity w are preserved with the flat field 38, where the time front tilt dT/u grows with ion velocity u and the steering angle dw/u decreases with ion velocity u. By arranging larger $K_0/K_1$ ratio, the combination of wedge field with post-acceleration provides a convenient and powerful tool for adjustable steering of the time fronts of ion packets, accompanied by negligibly minor steering of ion rays.

Again referring to FIG. 3, one embodiment 31 of ion mirror with amplifying reflecting wedge field comprises a regular structure of parallel mirror electrodes, all aligned in the Z-direction, where C denotes the cap electrode, and E1 denotes the first mirror frame electrode. Although only one mirror frame electrode E1 is shown, a plurality of such mirror frame electrodes may be provided stacked in the Z-direction (e.g. usually, from 4 to 8 such electrodes). Mirror 31 further comprises a thin wedge electrode W, located between cap electrode C and first electrode E1. The wedge electrode W has a constant thickness in the X-direction and is aligned parallel with the Z-axis. However, as shown in the lower part of embodiment 31, the wedge electrode has a wedge-shaped (tapered) window in the YZ-plane for variable attenuation of the field due to the cap electrode C potential. Such wedge window appears sufficient for minor curving of reflecting equipotential lines 36 in the XZ-plane, while having minor effect on the structure and curvatures of the XY-field, which is important for ion optical quality of the ion mirror—high order (up to full 3rd order) isochronicity, up to 5th order time per energy focusing, spatial quality and low spatial aberrations.

A simulated ion optical model for a realistic ion mirror with wedge electrode W of embodiment 31 is illustrated by icons 32 and 33, where icon 32 shows the electrode structure (C, W and E1) around the ion reflection region and also shows equipotential lines in the XY-plane at one particular Z-coordinate. Icon 33 illustrates a slight bending of retarding equipotential 36 in the XZ-middle plane at strong disproportional compression of the picture in the Z-direction, so that the slight curvature of the line 36 can be seen. Dark vertical strips in icon 33 correspond to ion trajectories, arranged at relative energy spread $\delta=0.05$, so that angled tips illustrate the range of ion penetration into the mirror. Icon 33 shows that the wedge field 35 is spread in the Z-direction in the region for several ion reflections, which helps distributing the time-front tilting at yet smaller bend and smaller displacement of equipotential 36.

Figure 7:
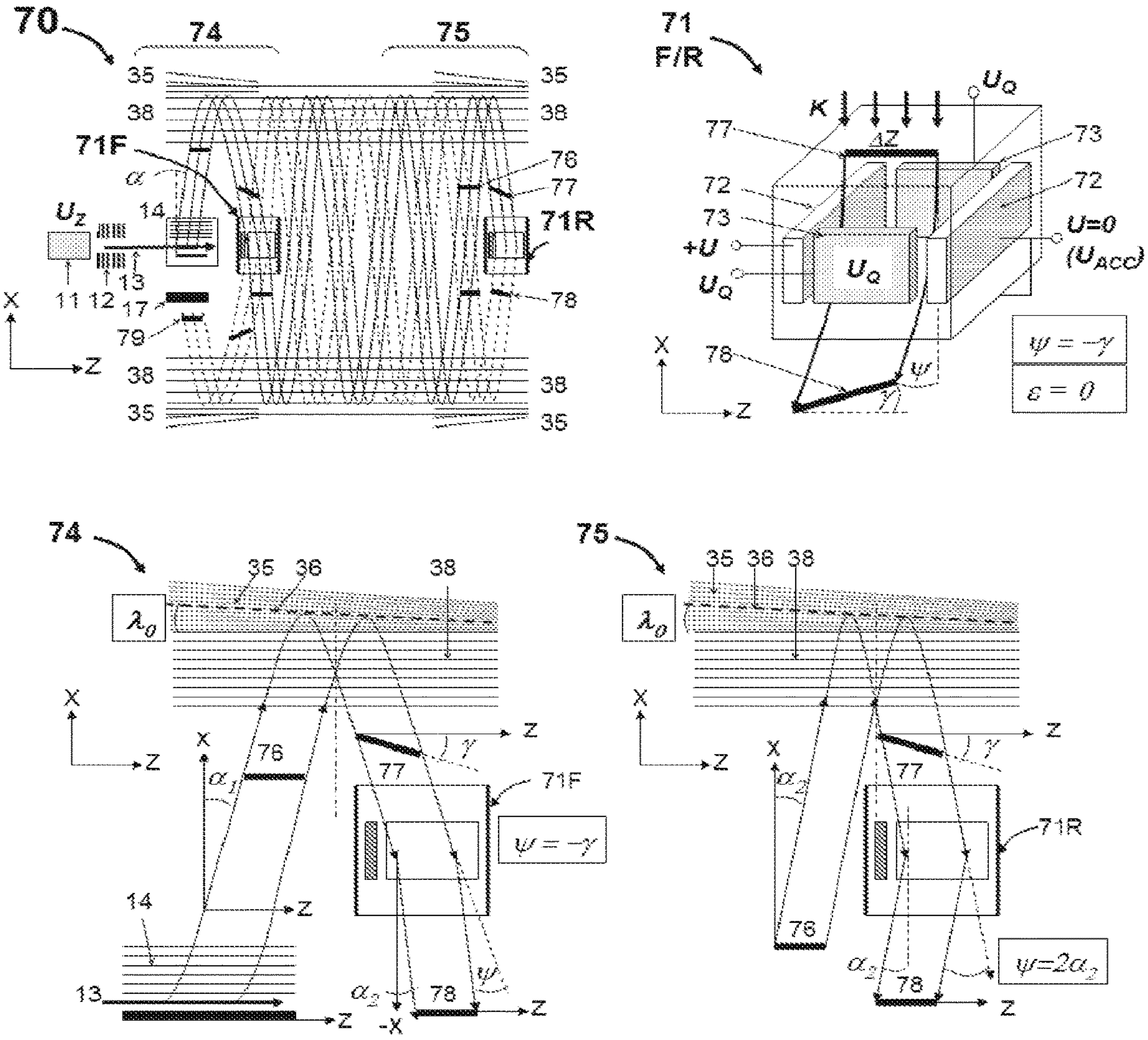
FIG. 7 illustrates novel methods of compensated ion steering of embodiments of the present invention used for improved ion injection and for improved reversal of ion drift motion, both being achieved with novel wedge mirror fields in combination with novel compensated deflectors.

Simulations have confirmed that: (i) adjustments of the amplifying factor of $4(K_0/K_1)^{0.5}$ allows strong tilting of the time-front at small wedge angles $\lambda_0$, thus not ruining the structure of electrical fields, which are optimized for reaching overall isochronicity and spatial focusing of ion packets; (ii) the time front tilt angle can be electronically adjusted from, for example, from 0 to 6 degrees if using wedge W in both opposite ion mirrors; (iii) the compensation of the time-front tilting for deflectors (see FIG. 7) is reached simultaneously with compensation of chromatic dependence of the Z-velocity, as illustrated in FIG. 7.

Figure 4:
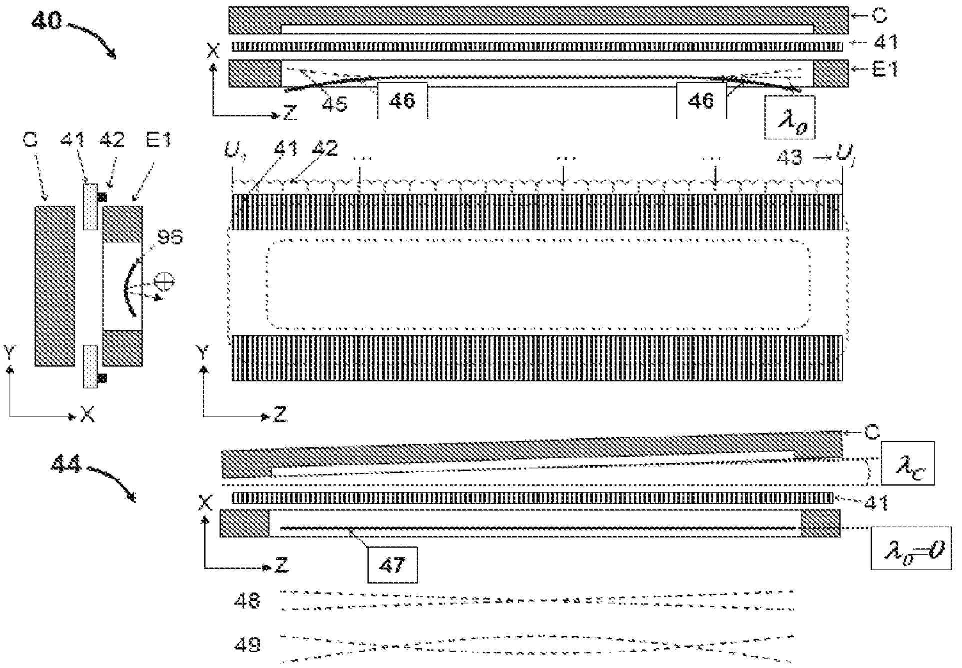
FIG. 4 shows another embodiment of the present invention of the amplifying wedge mirror field, achieved with an auxiliary printed circuit board (PCB), and shows compensation of unintentional misalignment of ion mirror electrodes.

Referring to FIG. 4, yet another embodiment 40 of ion mirror with an amplifying wedge reflecting field is shown comprising conventional ion mirror electrodes (cap electrode C, first frame electrode E1, and optional further frame electrodes E2, etc.) and further comprising a printed circuit board 41, placed between cap C and first mirror electrode E1. PCB 41 may either be composed of two aligned parallel PCB plates or may be one PCB with a constant size (z-independent) window, being a wider window than the one in the first frame electrode E1 to prevent the board 41 being charged by stray ions.

To produce a desired curvature or bend of the ion retarding equipotential 46, the PCB 41 carries multiple conductive pads, connected via surface mounted resistive chain 42, energized by several power supplies $U_1 \ldots U_j$ 43. Preferably, absolute voltages of supplies 43 are kept low, say under 1 kV, which is to be achieved at ion optical optimization of the mirror electrode structure. The net of resistors 42 and power supplies 43 allows adjusting the voltage distribution on PCB 41 flexibly and electronically, thus generating a desired tilt or curvature of retarding equipotential 46, either positive or negative, either weak or strong, either local or global, as illustrated by dashed lines 45. Flexible electronic control over tilt and curvature of the retarding line 46 is a strong advantage of the PCB wedge embodiment 40.

Again referring to FIG. 4, an exemplary embodiment 44 illustrates the case of mirror cap electrode C being unintentionally tilted by angle $\lambda_C$ to the Z-axis, this angle being expected to be a fraction of 1 mrad at realistic accuracy of mirror manufacturing. A printed circuit board 41 may be used for recovering the straightness of the reflecting equipotential 47, primarily designed for local compensation of the time-front tilting by unintentional mirror faults. Similarly, a second (opposing) ion mirror may have another PCB with a quadratic distribution of PCB potentials for electronically controlled correction of unintentional overall bend of ion mirror electrodes. Exemplary retarding equi-potentials 48 and 49 illustrate the ability of forming a compensating wedge or curvature.

Some practical aspects of using and tuning of PCB wedge are considered. Optionally, PCB electrodes 41 may be used at manufacturing tests only. The occurred inaccuracy of ion mirrors may be determined when measuring the required PCB compensation at recovered MRTOF resolution, which in turn could be used for calibrated mechanical adjustment of individual ion mirrors. Alternatively, the number of regulating power supplies 43 may be potentially reduced and the strategy of analyzer tuning may be optimized for constant use. It is expected that a pair of auxiliary power supplies may be used for simultaneous reaching of: creating preset wedge fields at far and near Z-edge, compensating electrodes faulty tilts, and compensating electrodes faulty bends. Indeed, all wedge fields may produce the same action—they tilt the time front of ion packets, and it is expected that a generic distribution of PCB potential may be pre-formed for each mirror, while controlling overall tilt and bow of wedge fields by a pair of low voltage power supplies 43.

Compared to wedge slit W in FIG. 3, PCB wedge mirrors 40 and 41 of FIG. 4 look more attractive for being more flexible. Adjusting potentials allows adjusting amplitude and sign of bend or tilt of the reflecting equipotential 46.

The proposed compensation mechanism of FIG. 3 and FIG. 4 relaxes the precision requirements onto parallelism and precision of ion mirror electrodes from the tens of microns range (as described in FIG. 1) to 100-300 um range and, hence, may allow using lower precision technologies. Embodiments of the invention propose ion mirrors manufactured with more robust, reproducible, and lower cost technology of printed circuit boards (PCBs) at standard (for PCB) precision, being notably lower compared to precision obtainable at standard electrode machining, while using PCB wedge compensation.

Figure 5:
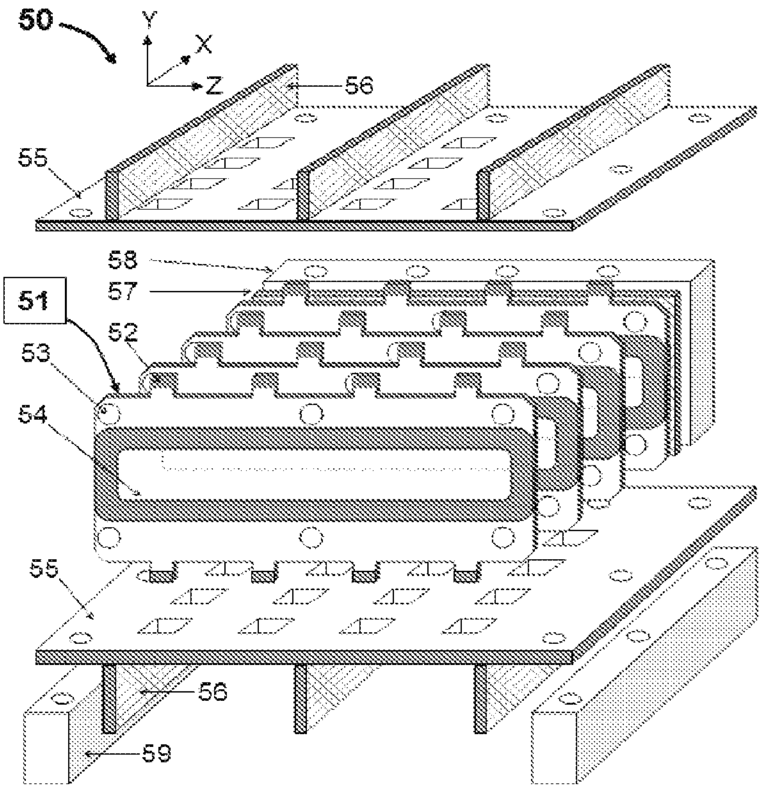
FIG. 5 shows one embodiment of PCB ion mirror of the present invention.

Referring to FIG. 5, one embodiment 50 of a PCB ion mirror of the present invention comprises: PCB electrodes 51 each having a conductive window 54, attachment ribs 52, and optional aligning holes 53; a base support 55; stiffing ribs 56 and/or stiffing supports 59; a compensating PCB 57 with multiple conductive pads; and an optional spacing electrode 58. PCB ion mirror 50 incorporates features to solve deficiencies of standard PCB technology:

It is important that compensating PCB 57 is used to form an electronically controlled wedge reflecting field (e.g. as described in FIG. 4) for the purpose of compensating electrodes 51 misalignments and limited parallelism, specified at 0.1 mm in PCB technology. It is believed that PCB ion mirrors are unable to operate in practice without this feature.

The internal edge of window 54 is made conductive, similarly to standard PCB vias (usually made electrolytic). The preferred coating is Nickel, referred to in PCB industry as soft gold. The conductive rim may be at least three times wider than the gaps between electrodes 51 to minimize the insulator exposure and to avoid field effects of charged surfaces.

The tracking distance of uncoated PCB is arranged at outer sides of PCB 51 to reduce surface gradient to under 300-500V/mm, where surface discharges are known to start at 1 kV/mm. Yet a larger tracking distance may be obtained if avoiding direct contact between edges of electrode 51 and base plate 55.

Though base support 55, stiffing ribs 56 or stiffing supports 59 may be made of any mechanically stable material, preferably, we propose PCB material for matching the thermal expansion coefficient (TCE) of electrodes 51, e.g. being 4-5 ppm/C for wide spread FR-4 PCB material. Otherwise, large thermal variations (specified from −50 to +50 C) at instrument transportation may ruin the ion mirror precision and flatness. Optionally, one may use more expensive materials with close TCE, say Titanium or ceramics, however, authors are not aware of any low cost material with matching TCE, except G-10 (equivalent of FR-4 PCB), which is far less preferable for reasons of generating dust and chips. Moreover, PCB supports and ribs allow convenient soldering. Slits in supports 55 are aligned with electrode ribs 52, so that ribs could be soldered at outer sides of PCB 55.

Embodiment 50 may be designed to compensate for the expected moderate PCB flexing. PCB electrodes 51 are stiff in the X- and Y-direction. Multiple aligning ribs 52 are soldered to slits in the base support 55, providing stiffness in the Z-direction. Flexing of base PCB plate 55 in the Y-direction (harmful at precision assembly) is compensated by attaching stiffing PCB ribs 56, or stiffing supports 59. Supports 59 may be metal (say aluminium) if using a hole and slit mounting to overcome TCE mismatch. Thus, PCB flexing is prevented in the fully assembled ion mirror in all three directions, where initial parallelism before soldering may be improved by technological jigs.

Figure 6:
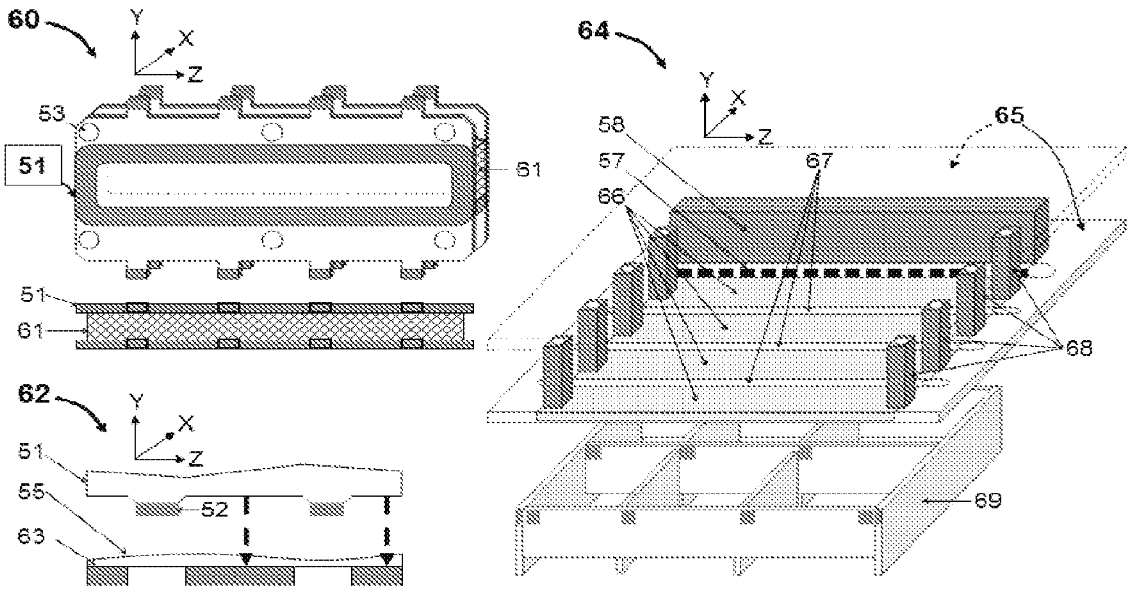
FIG. 6 shows another embodiment of PCB ion mirror of the present invention and shows technological improvements for PCB ion mirrors.

Referring to FIG. 6, embodiment 60 further improves the straightness and stiffness of individual mirror electrodes 51 before the step of entire mirror assembly by soldering of PCB or metal ridges 61 between a pair of electrodes 51. Parallelism of external surfaces of electrodes 51 and mutual alignment of windows 54 may be improved with technological jigs, e.g. referenced with aligning holes 53. Optionally, the same jig may be used for both the attachment of ridges and the assembly of the entire ion mirror.

Again referring to FIG. 6, another important step is proposed for improving the precision of electrode mounting, which is very likely to be affected by large variations of PCB thickness, specified to 5% of PCB thickness and rarely controlled at PCB manufacturing. Embodiment 62 illustrates the approach with exemplary milled slot 63 machined in PCB base plate 55 for precision of matching between bottom surface of base 55 and the edge of electrode 51. It is assumed that the bottom surface of PCB 55 is pressed against a flat and hard surface at machining and then to rigid jig fixture or support 59 during assembly stage. Similar slots may be machined on ribs 52 for improved parallelism of electrodes 51.

Preferably, external edge and ribs 52 are milled simultaneously with internal window 54 to ensure their parallelism, specified at 0.1 mm in PCB industry, while typically being better. Yet preferably, simultaneously machined aligning holes 53 may serve for better alignment of the windows in the electrodes 51 windows.

Again referring to FIG. 6, another embodiment of PCB ion mirror 64 of the present invention comprises: a pair of parallel PCB plates 65, connected via side stands 68 and enforced by stiffing ribs 69; a compensating PCB 57 with multiple pads, interconnected by (not shown) a resistive chain; and an optional spacing electrode 58, which may also serve as a mirror cap. FIG. 6 shows the bottom half of ion mirror 64 in solid lines and upper plate 65 in dashed lines. Slits 67 are machined mutually parallel (at single installation) and aligned with not shown reference holes. Straightness and flatness of strips 66 is improved with PCB stiffing ribs 69, soldered at conductive pads, preferably on external side of ion mirror 64. Preferably, back side of PCB plate 65 has machined slots (similar to 63) for improved precision of ribs mounting, ensuring plate 65 straightness after the assembly.

Electrodes of ion mirror 64 are formed as follows. Plates 65 have multiple conductive coated strips 66, which are separated by slits 67 with partially conductive edges. To arrange electrical separation of adjacent electrodes, slits 67 are made partially conductive, for example by initially making fully conductive edges with PCB vias technology, and then disrupting the coating by making additional holes at far Z-edges of slits 67.

Without going into further details, the inventors claim that embodiment 64 also satisfies all measures of embodiment 60 for compensating deficiencies of standard PCB technology.

The inventors believe that known methods of making PCB ion optical components were missing most of those steps and could not provide precision, sufficient for ion mirrors.

Referring to FIG. 7, an embodiment of an improved MRTOF 70 of the present invention is shown comprising: a conventional ion source 11, generating ion beam 13 along the Z-axis; an orthogonal accelerator 14 (or any other pulsed source) aligned with the Z-axis; a pair of gridless ion mirrors with two-dimensional fields 38 aligned with the Z-axis and local wedge fields 35; and front and rear deflectors 71F and 71R. Ion packets are steered by deflectors 71 to control the ion packets inclination angle $\alpha$ with respect to the X-axis. The time front tilting angle $\gamma$ of ion packets, introduced by deflectors 71 is compensated by the combination of mirror wedge fields 35 and post-accelerating flat field 38 to bring the ion packets time front 79 being parallel to face of detector 17. Yet strongly preferably, the time front compensation is arranged locally in close vicinity of every deflector, so that spatial mixing of ion packets would not affect MRTOF isochronicity. Ion packet steering and tilting at front and rear zones are shown below in zoom views 74 and 75.

Again referring to FIG. 7, preferably, novel deflector 71 (F or R) of embodiments of the present invention comprise a pair of deflection plates 72 at potentials U and 0 (referenced to acceleration potential $U_{ACC}$), or biased for symmetric potentials +U/2 and −U/2) and side plates 73 set at different potential $U_Q$. Side plates are known as Matsuda plates in sectors. Side plates 73 generate an additional quadrupolar field. The Z-component of the overall electric field becomes, for example, $E_Z=U/H-2U_Q*z/H^2$, where H and D are distance and effective length of the deflecting field, and z is coordinate within ion packet. The quadrupolar field compensates to first order the variations of the ion steering angle ψ, produced by ions slowing down in the region of higher deflection potential and removes the over-focusing effect of conventional deflectors. As a result, deflector 71 is capable of compensating for the angular dispersion of conventional deflectors, is capable of steering ion rays for the same angle ψ independent on the Z-coordinate (i.e. focal distance F→∞), and tilts the time front for constant angle γ=−ψ, i.e. keeps time fronts straight. Alternatively, deflector 71 is capable of controlling the focal distance F independent of the steering angle ψ:

$$E_Z=U/H-E_Q*z/H,$$

$$\psi=D/2H*U/K;\gamma=-\psi$$

$$1/F=2\ \psi^2/D-K/U_QD=1/D(2\phi^2-K/U_Q)$$

where K is the mean energy of ion packets.

Compensated deflectors 71 nicely fit MRTOF. The quadrupolar field in the Z-direction generates an opposite focusing or defocusing field in the transverse Y-direction. Below simulations prove that the focal properties of MRTOF analyzers are sufficient to compensate for the Y-focusing of deflectors 71 without any significant TOF aberrations.

Alternatively, compensated deflectors may be trans-axial (TA) deflectors, formed by wedge electrodes. The invention proposes using a second order correction, produced by an additional curvature of TA-wedge. Controlled focusing/defocusing may be also generated by combination of the TA-wedge and TA-lens, arranged separately or combined into a single TA-device. For a narrower range of deflection angles, the compensated deflector may be arranged with a single potential while selecting the size of Matsuda plates or with a segment of toroidal sector.

Again referring to FIG. 7, zoom views 74 and 75 of embodiment 70 illustrate methods and embodiments of (a) compensated ion injection at front end (74); and (b) compensated ion packet steering and drift reversal at the rear end (75).

View 74 illustrates the method of compensated ion injection. Ion injection mechanism into MRTOF of the embodiments of the present invention comprises: a "flat" orthogonal accelerator (OA) 14 aligned with the Z-axis; an ion mirror with a "flat" field 38 at higher ion energies; a reflecting wedge field 35 with retarding equipotential 36 tilted at 20 angle; and a compensated deflector 71, preferably located along the ion path and after first ion mirror reflection.

Ion beam 13 propagates along the Z-axis at elevated (compared to FIG. 1) energies (e.g. 20-50V) to enhance ion admission into OA 14, to increase the inclination angle α1 of ion rays, thus, improving ion packet bypassing the OA rim, and to reduce the ion packets angular divergence Δα. The time-front 76 of ejected ion packets is parallel to the Z-axis, since both ion beam 13 and OA 14 are parallel to the Z-axis. After ion reflection within the wedge mirror field 35 and after post-acceleration in the flat field 38, ion packets' time-front 77 becomes tilted at angle $\gamma>>\lambda_0$, as has been explained in FIG. 3. Ion rays are then steered back in compensated deflector 71F by angle ψ=−γ, so that the inclination angle $\alpha_2=\alpha_1-\psi$ is notably reduced, allowing for denser folding of ion rays in MRTOF (for the purpose of higher resolution), while the orientation of the time front 78 is recovered for γ=0.

Again referring to FIG. 7, view 75 illustrates the method and mechanism of compensated back-end steering in MRTOF with wedge field. The back end of ion mirror comprises a similar "flat" entrance field 38, and a wedge reflecting field 35 with retarding equipotential line 36 tilted at an angle $\lambda_0$. Ion packets 76 arrive to the far Z-end after multiple reflections in MRTOF, where they traveled at an inclination angle $\alpha_2$ and with the time-front 76 being parallel to the Z-axis, i.e. γ=0. After ion reflection in mirror wedge field 35 and after post-acceleration in flat field 38, ion packets time-front 77 becomes tilted for relatively large (say, 3 deg) angle $\gamma=2\alpha_2$. Ion rays are steered back by angle $\psi=-\gamma=2\alpha_2$ in compensated deflector 71R, so that the inclination angle becomes $-\alpha_2$, while orientation of the time front 78 is recovered for γ=0. As a result, ion drift motion in the Z-direction is reverted without tilting of the time-front, which helps to achieve about twice denser folding of ion rays in MRTOF 70.

Similar time front compensation occurs in-front of the detector 17. Ions arrive at the inclination angle $\alpha_2$, deflector 71F steers ion rays and tilts time front, since deflector 71F is set static and it was set in deflecting state at the ion injections stage 74. Wedge field 35 with flat post-acceleration field 38 tilts the time front to compensate for the tilt at ray steering. The resulting time front 79 is then set parallel to the Z-axis, which simplifies the detector installation.

Alternatively, the front deflector 71F may be pulsed for trapping ion packets for multiple Z-passages, this way increasing the ion flight time and flight path with the purpose of increased resolution.

Table 2 below presents formulas for time front tilt angles γ, for ray steering angles ϕ and for chromatic dependence d(Δw)/dδ of the Z-component of ion velocity w induced by wedge ion mirror and by deflectors. Table 3 below shows conditions for compensating the time front tilt and the chromatic dependence of the Z-velocity in the combined system, which may be achieved simultaneously.

TABLE 2

| | Time-front Tilt Angle | Rays Steering Angle | Chromatic dependence of Z-velocity d(Δw)/dδ |
|---|---|---|---|
| Wedge Mirror | $\gamma_0^{(M)}=4\lambda_0\sqrt{\frac{K_0}{K_1}}$ | $\varphi^{(M)}\approx+\frac{4\lambda_0}{3}\sqrt{\frac{K_1}{K_0}}$ | $2\lambda_0u_0\sqrt{\frac{K_0}{K_1}}$ |
| Deflector | $-\psi_0$ | $\psi_0$ | $-\frac{1}{2}u_0\psi_0$ |

TABLE 3

| | Condition for the 1st order Time-front Tilt Compensation | Condition for Compensating Chromatic Spread of Z-velocity |
|---|---|---|
| Wedge Mirror + Deflector | $4\lambda\sqrt{\frac{K_0}{K_1}}=\psi_0$ | $4\lambda\sqrt{\frac{K_0}{K_1}}=\psi_0$ |

Overall, accounting for all above described methods of compensated ion steering, embodiment 70 allows: (i) a more efficient ion injection at higher energies; (ii) dense folding of ion rays for multiple reflections; (iii) reversal of ion rays for doubling ion path; (iv) compensating additional time-of-flight aberrations associated with steering of elongated (in the Z-direction) ion packets; (v) compensating chromatic angular spreads for reduced ion packet divergence; and (vi) compensating Y-related TOF and spatial aberrations of deflectors by spatial and isochronous properties of ion mirrors. Below described simulations do confirm those claimed positive effects.

The above described methods allow minor compensation of components (OA, mirrors detector) misalignments by adjusting ion injection energy, steering angles and strength of wedge fields. Wedges 35 may be combined with global compensation of ion mirror misalignment 44 of FIG. 4.

Figure 8:
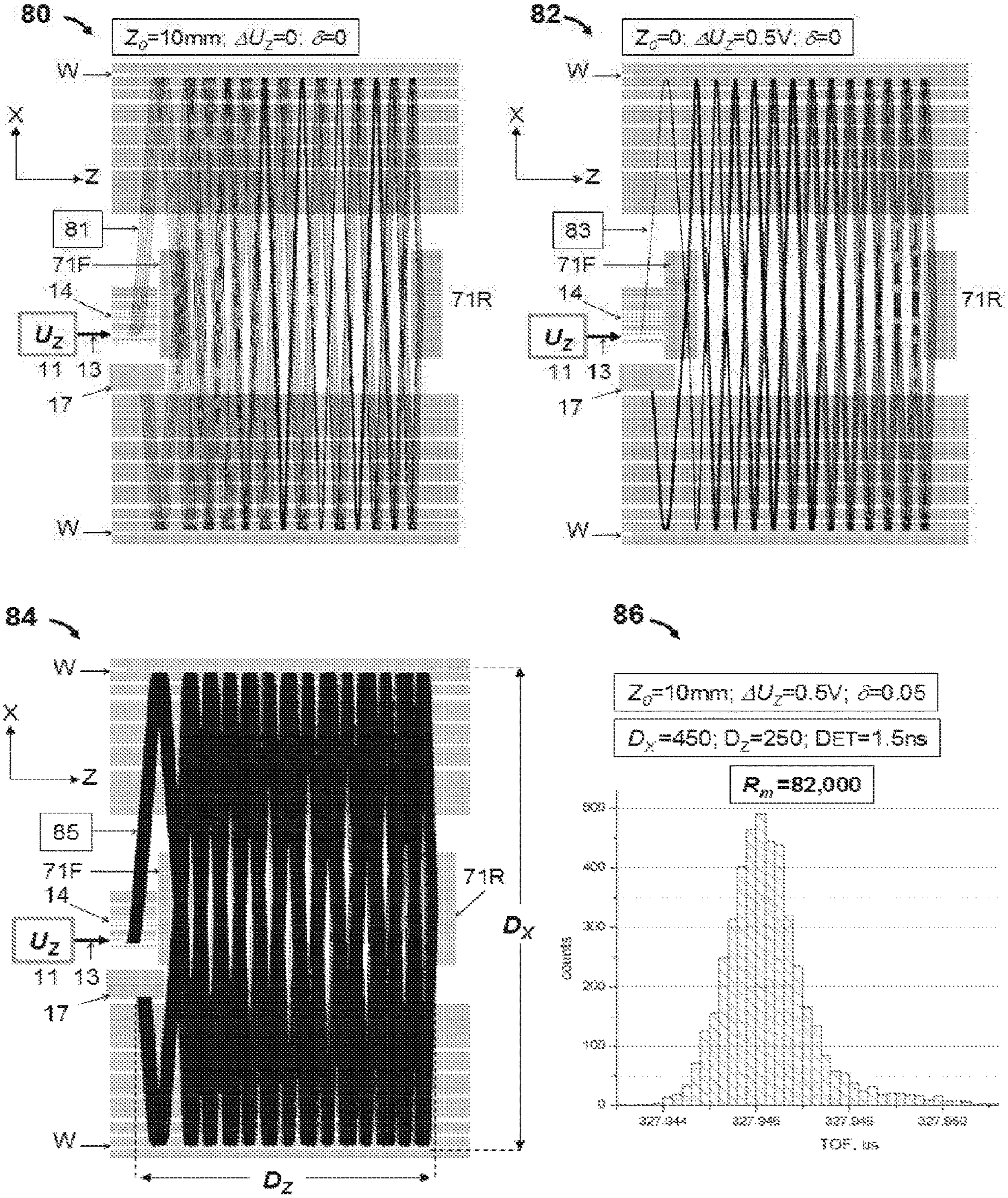
FIG. 8 shows results of ion optical simulations verifying improvements of FIG. 7.

Referring to FIG. 8, there are presented results of ion optical simulations of MRTOF 70 with compensated ion injection and with compensated reversal of ion trajectory in the Z-direction. The exemplar simulated compact MRTOF 80 comprises: parallel ion mirrors with cap-cap distance $D_X$=450 mm and useful length $D_Z$=250 mm, separated by a drift space at $U_X$=−8 kV acceleration voltage; an ion source 11 generating an ion beam 13 along Z-axis at $U_Z$=57V specific energy with $\Delta U_Z$=0.5V spread; a straight orthogonal accelerator 14 OA aligned with the Z-axis; front and rear deflectors 71F and 71R with compensating Matsuda plates; a wedge electrode W at front and rear Z-end; and a detector 17 at front Z-end.

Example 80 illustrates spatial focusing of ion rays 81 for $Z_0$=10 mm long ion packets, while not accounting angular spread of ion packets $\Delta\alpha$=0 at $\Delta U_Z$=0 and not accounting relative energy spread of ion packets $\delta=\Delta K/K=0$ at $\Delta X$=0. The chosen position of deflector 71F improves the ion packets bypassing of the deflector 71F and of detector 17 rim. Matsuda plates' voltages of the deflectors 71F and 71R are electrically adjusted for moderate spatial focusing of initially parallel rays onto detector 17, while being balanced for achieving optimal focusing in other examples of FIG. 8.

Example 82 illustrates angular divergence of ion rays 83 at $\Delta U_Z$=0.5V, while not accounting ion packets width $Z_0$=0 and energy spread δ=0. Matsuda plate of the reversing deflector 71R is adjusted (being the same for all examples of FIG. 8) for spatial focusing of initially diverging rays onto detector 17.

Example 84 illustrates ion rays at all accounted spreads of ion beam. Though trajectories look filling most of the drift space, apparently, simulated ion losses are within 10%.

Example 86 presents the overall mass resolution $R_M$=82,000 achieved in compact 450×250 mm analyzer while accounting all realistic spreads of ion beam and ion packets, so as DET=1.5 ns time spread. The outstanding performance and low level of analyzer aberrations prove the entire concept and confirms the claimed low TOF and spatial aberrations of MRTOF with the novel wedge ion mirror.

Yet higher resolutions are expected at larger size instruments, since the flight path L grows as product of instrument dimensions: $L=2D_X*D_Z/L_Z$, where $L_Z$ is the ion advance per reflection. Note that the dense packing became available with the novel mechanism of compensated ion injection of the present invention.

ANNOTATIONS

Coordinates and Times:

x,y,z—Cartesian coordinates;

X, Y, Z—directions, denoted as: X for time-of-flight, Z for drift, Y for transverse;

$Z_0$—initial width of ion packets in the drift direction;

ΔZ—full width of ion packet on the detector;

$D_X$ and $D_Z$—used height (e.g. cap-cap) and usable width of ion mirrors

L—overall flight path

N—number of ion reflections in mirror MRTOF or ion turns in sector MTTOF u—x-component of ion velocity;

w—z-component of ion velocity;

T—ion flight time through TOF MS from accelerator to the detector;

ΔT time spread of ion packet at the detector;

Potentials and Fields:

U—potentials or specific energy per charge;

$U_Z$ and $\Delta U_Z$—specific energy of continuous ion beam and its spread;

$U_X$—acceleration potential for ion packets in TOF direction;

K and ΔK—ion energy in ion packets and its spread;

δ=ΔK/K—relative energy spread of ion packets;

E—x-component of accelerating field in the OA or in ion mirror around "turning" point;

μ=m/z—ions specific mass or mass-to-charge ratio;

Angles:

α—inclination angle of ion trajectory relative to X-axis;

Δα—angular divergence of ion packets;

γ—tilt angle of time front in ion packets relative to Z-axis

λ—tilt angle of "starting" equipotential to axis Z, where ions either start accelerating or are reflected within wedge fields of ion mirror θ—tilt angle of the entire ion mirror (usually, unintentional);

φ—steering angle of ion trajectories or rays in various devices;

ψ—steering angle in deflectors

ε—spread in steering angle in conventional deflectors;

Aberration Coefficients

T|Z, T|ZZ, T|δ, T|δδ, etc;

Indexes are within the text

Although the present invention has been describing with reference to preferred embodiments, it will be apparent to those skilled in the art that various modifications in form and detail may be made without departing from the scope of the present invention as set forth in the accompanying claims.

The invention claimed is:

1. A mass spectrometer comprising:

a multi-reflecting time-of-flight mass analyser having two ion mirrors that are elongated in a drift direction (z-dimension) and configured to reflect ions multiple times in an orthogonal oscillation dimension (x-dimension); a pulsed ion accelerator for pulsing ion packets into one of the ion mirrors; and an ion detector;

wherein at least one of the ion mirrors provides equipotential field lines that diverge or converge relative to the drift dimension (Z-direction) and through which the ions pass; and wherein the mass spectrometer comprises a mirror having a length in the drift direction that includes only parallel equipotential field lines for reflecting ions.

2. The mass spectrometer of claim 1, wherein the pulsed ion accelerator and ion detector are arranged at the same end of the mirrors, in the drift direction, and the ions are caused to travel from said same end of the mirrors to the other end of the mirrors and then to said ion detector.

3. The mass spectrometer of claim 1, comprising electrodes arranged on opposing sides of the ion mirrors in a third dimension (y-dimension) that is orthogonal to the oscillation dimension (x-dimension) and the drift direction (z-dimension).

4. The mass spectrometer of claim 3, comprises one or more voltage supply configured to apply voltages to the electrodes for generating equipotential field lines that diverge or converge.

5. The mass spectrometer of claim 3, comprising a plurality of electrodes arranged on a first side of the ion mirrors, in the third dimension, and a plurality of electrodes arranged on an opposite side of the ion mirrors.

6. A method of mass spectrometry comprising:

providing a mass spectrometer as claimed in claim 1; and reflecting ions between the ion mirrors in the oscillation dimension (x-dimension).

7. A mass spectrometer comprising:

a multi-reflecting time-of-flight mass analyser having two ion mirrors that are elongated in a drift direction (z-dimension) and configured to reflect ions multiple times in an orthogonal oscillation dimension (x-dimension); a pulsed ion accelerator for pulsing ion packets into one of the ion mirrors; an ion detector; and an ion deflector configured to back-steer the average ion trajectory of the ions, in the drift direction, thereby tilting the angle of the time front of the ions;

wherein at least one of the ion mirrors provides equipotential field lines that diverge or converge relative to the drift dimension (Z-direction) and through which the ions pass.

8. The mass spectrometer of claim 7, wherein said spectrometer is configured to tilt the time front of the ions passing therethrough so as to at least partially counteract a tilting of the time front by the ion deflector.

9. A mass spectrometer comprising:

a multi-reflecting time-of-flight mass analyser having two ion mirrors that are elongated in a drift direction (z-dimension) and configured to reflect ions multiple times in an orthogonal oscillation dimension (x-dimension); a pulsed ion accelerator for pulsing ion packets into one of the ion mirrors; and an ion deflector configured to back-steer the average ion trajectory of the ions, in the drift direction, thereby tilting the angle of the time front of the ions;

wherein the spectrometer comprises tuning electrodes arranged on opposing sides of the ion mirrors in a third dimension (y-dimension) that is orthogonal to the drift direction (z-dimension) and the oscillation dimension (x-dimension).

10. The mass spectrometer of claim 9, comprising voltage supplies configured to apply voltages to the tuning electrodes for generating equipotential field lines that diverge, converge or curve.

11. The mass spectrometer of claim 10, wherein the ions pass through the equipotential field lines that diverge, converge or curve.

12. The mass spectrometer of claim 10, wherein the voltage supplies are configured to be adjustable so as to adjust the voltages applied to the tuning electrodes.

13. The mass spectrometer of claim 9, comprising a plurality of tuning electrodes arranged on a first side of the ion mirrors, in the third dimension, and a plurality of tuning electrodes arranged on a second opposite side of the ion mirrors.

14. The mass spectrometer of claim 9, wherein an ion mirror comprises electrodes that are tilted at an angle to the drift direction.

15. The mass spectrometer of claim 9, comprising an ion detector, wherein the pulsed ion accelerator and ion detector are arranged at the same end of the mirrors, in the drift direction, and the ions are caused to travel from said same end of the mirrors to the other end of the mirrors and then to said ion detector.

16. The mass spectrometer of claim 9, wherein said spectrometer is configured to tilt the time front of the ions passing therethrough so as to at least partially counteract a tilting of the time front by the ion deflector.

17. A method of mass spectrometry comprising:

providing a mass spectrometer as claimed in claim 9; and reflecting ions between the ion mirrors in the oscillation dimension (x-dimension).

18. A method of tuning an ion mirror comprising:

providing an ion mirror as claimed in claim 9; and adjusting voltages applied to the tuning electrodes.

* * * * *